US008893254B1

(12) United States Patent
Khanfar et al.

(10) Patent No.: US 8,893,254 B1
(45) Date of Patent: Nov. 18, 2014

(54) DYNAMIC INSERTION OF SERVICE SPECIFIC PRIVACY PROXY ELEMENTS (71) Applicant: Sprint Communications Company L.P., Overland Park, KS (US)

(72) Inventors: Ameen Khanfar, Lee's Summit, MO (US); Raymond Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 6 days.

(21) Appl. No.: 13/786,452

(22) Filed: Mar. 6, 2013

(51) Int. Cl.
*H04L 29/06* (2006.01)
*G06F 9/00* (2006.01)
*G06F 15/16* (2006.01)
*G06F 17/00* (2006.01)
*G06F 15/173* (2006.01)

(52) U.S. Cl.
CPC ........ *H04L 63/0281* (2013.01); *H04L 63/0407* (2013.01)
USPC .............................. 726/12; 709/240; 709/242

(58) Field of Classification Search
CPC . H04L 63/0281; H04L 63/04; H04L 63/0407; H04L 63/0421; H04L 63/306
USPC .......................................................... 726/12
See application file for complete search history.

(56) References Cited

U.S. PATENT DOCUMENTS

| 6,101,549 | A  | * | 8/2000  | Baugher et al. | 709/238 |
|-----------|----|---|---------|----------------|---------|
| 7,305,473 | B2 | * | 12/2007 | Vogt           | 709/227 |
| 8,171,032 | B2 | * | 5/2012  | Herz           | 707/748 |
| 8,201,248 | B2 | * | 6/2012  | Boesgaard      | 726/22  |
| 8,302,161 | B2 | * | 10/2012 | Burch et al.   | 726/3   |
| 8,468,271 | B1 | * | 6/2013  | Panwar et al.  | 709/249 |
| 8,612,750 | B2 | * | 12/2013 | Garcia et al.  | 713/160 |

OTHER PUBLICATIONS

R. Barrett and P. P. Maglio. Intermediaries: New places for producing and manipulating web content. Comput. Networks ISDN Syst. 30(1-7), pp. 509-518. 1998.*

* cited by examiner

*Primary Examiner* — Tae Kim
*Assistant Examiner* — Louis Teng (57) ABSTRACT

A method for providing security for mobile device users, comprising a data service node receiving from a first device a first message directed to a web provider, inserting an anonymizing forward-to header comprising a list of anonymizing gateways; based on the list, forwarding the message to a gateway that performs anonymizing functionality and forwards the message to an embedded-scripts-extracting gateway based on the list; the embedded-scripts-extracting gateway performing an embedded-scripts-extracting functionality and forwarding the message to the web provider. The data service node also receiving from a second device a second message directed to a web provider, inserting a child-protection forward-to header comprising a list of child-protection gateways; based on the list, forwarding the message to a gateway that performs child-protection functionality and forwards it to a cookies-extracting gateway based on the list; the cookies-extracting gateway performing a cookies-extracting functionality and forwarding the message to the web content provider.

20 Claims, 7 Drawing Sheets

DYNAMIC INSERTION OF SERVICE SPECIFIC PRIVACY PROXY ELEMENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Web content is becoming more and more accessible to users by way of mobile devices. However, with this convenience comes information security threats. Online privacy is becoming an ever-growing concern. Although active measures are being taken on both the state and federal levels to develop online privacy legislation, difficulties arise in its legal enforcement. Particularly, there is no current legislation requiring website publishers and content providers (WCPs) to honor and comply with any privacy directives. Thus, even when communications service providers take active steps to implement privacy policies, their efforts may be undermined by WCPs and others seeking to collect and to monetize consumer information. For example, WCPs are acquiring consumer information by routing http messages through their gateways to extract personal information.

SUMMARY

In some embodiments, a method is provided for providing security settings for multiple mobile device users. The method comprises sending, by a first mobile device, a first http message, wherein the first http message is directed to a web content provider host; receiving, by a data service node platform, the first http message from the first mobile device; determining, by the data service node platform, whether the mobile device is associated with a privacy service subscription; based on a determination that the first mobile device is associated with an anonymizing privacy service subscription, inserting, by the data service node, an anonymizing forward-to (XFT) header into the first http message, wherein the anonymizing XFT header contains an anonymizing XFT list, and wherein the anonymizing XFT list comprises a list of anonymizing gateways comprising an anonymizing gateway and a hidden-scripts-extracting gateway; determining, by the data service node, that the gateway listed first in the anonymizing XFT list is the anonymizing gateway; based on the determination, forwarding, by the data service node, the first http message to the anonymizing gateway; receiving, by the anonymizing gateway, the first http message; performing, by the anonymizing gateway, an anonymizing privacy information control functionality on the first http message comprising making the first http message anonymous; determining, by the anonymizing gateway, which gateway is designated as the next gateway in the anonymizing XFT list, wherein the next gateway in the anonymizing XFT list is the embedded-scripts-extracting gateway; based on the determination, forwarding, by the anonymizing gateway, the first http message to the embedded-scripts-extracting gateway; receiving, by the embedded-scripts-extracting gateway, the first http message; performing, by the embedded-scripts-extracting gateway, an embedded-scripts-extracting privacy information control functionality on the first http message comprising searching for and extracting embedded scripts from the first http message; determining, by the embedded-scripts-extracting gateway, whether another gateway is listed after itself in the anonymizing XFT list; based on determining that it is the last gateway listed in the anonymizing XFT list, forwarding the first http message to the web content provider host. The method further comprises sending, by a second mobile device, a second http message, wherein the second http message is directed to a web content provider host; receiving, by the data service node platform, the second http message from the second mobile device; determining, by the data service node platform, whether the second mobile device is associated with a privacy service subscription; based on a determination that the second mobile device is associated with a child-protection privacy service subscription, inserting, by the data service node, a child-protection forward-to (XFT) header into the second http message, wherein the child-protection XFT header contains a child-protection XFT list, and wherein the child-protection XFT list comprises a list of child-protection gateways comprising a child-protection gateway and a cookie-extracting gateway; determining, by the data service node, that the gateway listed first in the child-protection XFT list is the child-protection gateway; based on the determination, forwarding, by the data service node, the second http message to the child-protection gateway; receiving, by the child-protection gateway, the second http message; performing, by the child-protection gateway, a child-protection privacy information control functionality on the second http message comprising acting on the second http message to enforce child privacy legislation, determining, by the child-protection gateway, which gateway is designated as the next gateway in the child-protection XFT list, wherein the next gateway in the child-protection XFT list is the cookie-extracting gateway; based on the determination, forwarding, by the child-protection gateway, the second http message to the cookie-extracting gateway; receiving, by the cookie-extracting gateway, the second http message performing, by the cookie-extracting gateway, a cookie-extracting privacy information control functionality on the second http message comprising searching for and extracting cookies from the second http message; determining, by the cookie-extracting gateway, whether another gateway after itself is listed in the child-protection XFT list; based on determining that it is listed last in the child-protection XFT list, forwarding the second http message to the web content provider host.

In some embodiments a method is provided for protecting the identity of a mobile device user. The method comprises receiving, by a data service node platform, an http message from a mobile device, wherein the http message is directed to a web content provider host; determining, by the data service node platform, whether the mobile device is associated with a privacy service subscription; based on a determination that the mobile device is associated with a privacy service subscription, inserting, by the data service node, a forward-to (XFT) header into the http message, wherein the XFT header contains an XFT list, and wherein the XFT list comprises a list of gateways comprising an anonymizing gateway and a cleansing gateway; determining, by the data service node, that the anonymizing gateway is designated as the first gateway in the XFT list, and based on the determination, forwarding, by the data service node, the http message to the anonymizing gateway; receiving, by the anonymizing gateway, the http message; performing, by the anonymizing gateway, an anonymizing privacy information control functionality on the http message; determining, by the anonymizing gateway, that the next gateway in the XFT list is the cleansing gateway; based on the determination, forwarding, by the first gateway, the http message to the cleansing gateway; receiving, by the cleansing gateway, the http message; scanning, by the cleansing gateway, the XFT list, scanning, by the cleansing gateway, the http message for evidence indicative of where the http has traveled; comparing, by the cleansing gateway, the evidence indicative of where the http message has traveled with the XFT list; finding, by the cleansing gateway, that the http message has traveled according to the route designated by the XFT header, if the evidence indicative of where the http message has traveled correlates to the XFT list; or finding, by the cleansing gateway, the http message has traveled according to the route designated by the XFT header, if the evidence indicative of where the http message has traveled does not correlate to the XFT list; based on a finding that the http message has traveled according to the route designated by the XFT header: performing, by the cleansing gateway, a cleansing privacy information control functionality on the http message, determining, by the cleansing gateway, whether another gateway after itself is listed in the XFT list, based on the cleansing gateway determining that it is the last gateway listed in the XFT list, forwarding, by the cleansing gateway, the http message to the web content provider host; or based on a finding that the http message has not traveled according to the route designated by the XFT header, rejecting, by the cleansing gateway, the http message.

In some embodiments a data network is provided. The data network comprises a first gateway, a second gateway, a data service node configured to receive an http message from a mobile device determine whether the mobile device is associated with a privacy service subscription, based on a determination that the mobile device is associated with the privacy service subscription, insert a forward-to (XFT) header into the http message, wherein the XFT header contains an XFT list, and wherein the XFT list comprises a list of gateways, determine that the gateway listed first in the first XFT list is a first gateway, based on the determination, forward the http message to the first gateway, wherein the first gateway is configured to: receive the http message, perform a first privacy information control functionality on the http message, determine that the next gateway in the XFT list is a second gateway, based on the determination, forward the http message to the second gateway, wherein the second gateway is configured to: receive the http message, perform a second privacy information control functionality on the http message, determine it is the last gateway listed in the XFT list, based on determining that it is listed last in the XFT list, forward the http message to a web content provider host.

BRIEF DESCRIPTION OF THE DRAWINGS

These and other features will be more clearly understood from the following detailed description taken in conjunction with the accompanying drawings and claims.

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosed system and method pertains to consumer privacy in the realm of accessing web content via mobile devices. When a mobile device user accesses web content, the user may send an http request to the WCP. When the http request reaches the WCP, the request may supply to the WCP data indicative of the user's personal information, thereby enabling the WCP to track the user's activity and/or perform other invasive dealings. Moreover, as the http request travels from the user's mobile device to the WCP host, it may travel through gateways designed to extract personal information about the user from the request. Also, as an http response travels from the WCP host to the user's mobile device, the response may acquire (from the WCP host and/or from a gateway) embedded scripts that allow the user's activity to be tracked upon the mobile device's receipt of the response. Therefore, needed is a means for a communications service provider to anonymize a user's http message as the user accesses web content. Also needed is a means for the communications service provider to maintain control over the user's http message to thereby prevent the http message from being routed through third-party gateways that extract personal information and/or embed hidden scripts.

Described herein is a system and method for a communications service provider to protect its subscribers' personal information from third parties. The system and method may anonymize the subscribers' http messages so to make their personal information undiscoverable. The system and method may also provide the communications service provider with control over its customers' http messages as the http messages travel between subscribers' mobile devices and WCP hosts. More particularly, a dynamic insertion of service-specific privacy-proxy elements (DISPEL) architecture is disclosed, which supports a privacy service to which subscribers of communications service providers may subscribe. The DISPEL architecture can be implemented by way of improving a communications service provider's current data network.

The data network's data service nodes (DSN) platforms and gateways may be improved in order to compose a dynamic insertion of service-specific privacy-proxy elements (DISPEL) architecture. Particularly, the DSN platforms can be modified such that they become configured to insert a new forward-to (XFT) header into the user's http request/response message. The inserted forward-to header may include a new forward-to (XFT) list comprising a sequential list of gateways through which the http message is routed while travelling to the WCP host. The gateways are improved to comply with the DISPEL architecture so that as the http message travels through the gateways, the gateways perform information control functionalities (e.g., cleansing, anonymizing) on the message. The gateways are further improved such that each gateway forwards any request/response message to the next gateway specified in the XFT list. The gateway that is the last in the XFT list will be configured to forward the http message to the WCP host. Thus, when the http message reaches the WCP host, it has gone through the plurality of gateways and has thus experienced the several information control functionalities, thereby making the user's identity and information anonymous and untrackable to the WCP.

The assigning of the forward-to header to the http request/response message may take place at a DSN platform, thereby ensuring that the forward-to header is indeed created by the communications service provider and not by a WCP. The forward-to header establishes the particular route the http message will take to arrive at a web address. For example, the forward-to header may dictate that an http message must travel through a specific sequence of gateways before arriving at a web address. Thus, when a user requests to go to the web address, the http message will be routed through the specific sequence of gateways before providing the user access to the webpage.

The gateways may operate to anonymize the user's information. The gateway servers can perform at least one privacy information control functionality in the process of anonymizing. For example, a gateway can perform a cleansing function on the http message to identify and resolve attempts to exploit loop-holes in the http message. For example, a gateway may perform discovery and extraction of redirections, embedded scripts, encoded third-party URLs, and/or cookies, as well as other types of cleansing functions.

A plurality of gateways in a data network implementing DISPEL architecture may perform various privacy information control functionalities. For example, a forward-to header may route an http message through four gateway servers. The first server may search for and extract cookies, the second server may anonymize the message, the third server may act on the message so to enforce child privacy legislation, and the fourth gateway may search for and extract embedded scripts hidden in the content. Upon completing its journey through all four gateways, the http message may then be directed to the web address.

The gateways may also act as security check-points to ensure that the http message is in fact travelling the route assigned to it by the forward-to message. For example, upon receiving the http message, the fourth gateway may read the forward-to header and compare it to evidence indicating the servers through which the message has previously traveled. If the evidence corresponds with the forward-to header (e.g., the fourth gateway determines that the http message has indeed traveled through the first, second, and third gateways, and only the first, second, and third gateways) then the fourth gateway will accept the message, perform the cleansing process, and then direct the message to the WCP host. On the other hand, if the evidence does not correspond with the forward-to header (e.g., the fourth gateway determines that the http message has not traveled through all of the first, second, and third gateways, or, the fourth gateway determines that the http message has traveled through an additional gateway besides the first, second, and third gateways) then the fourth gateway will determine that the http message is potentially corrupt and, based on the determination, it will reject the message. Upon the gateway rejecting the message, the message will discontinue its travel and will not arrive at the web address, thereby preventing the user from accessing the web address and sacrificing the user's privacy.

Because the forward-to header may be provided by the communications service provider at a node, and because the same communications service provider may exercise control over the node as well as the gateway servers, the http message's route is carefully controlled and monitored by the communications provider throughout the entirety of its journey. Thus, the current system and method deters the risk that WCPs will intercept or gain control of the route.

Figure 1:
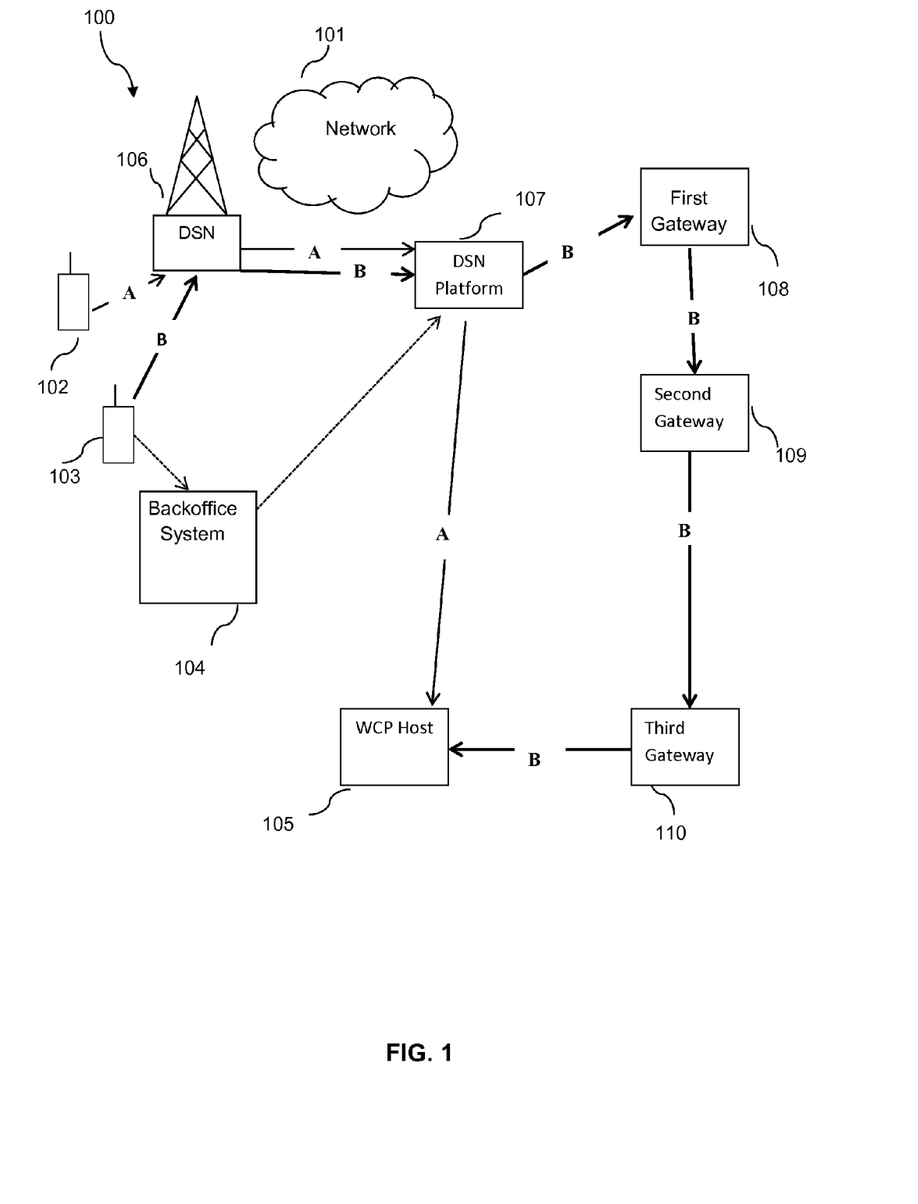
FIG. 1 is a block diagram of a data network comprising dynamic insertion of service-specific privacy-proxy elements (DISPEL) architecture according to an embodiment of the disclosure.

Turning now to FIG. 1, shown is a data network 101 implementing the DISPEL architecture 100. The data network 101 comprises a first mobile device 102, a second mobile device 103, a backoffice system 104, a WCP host 105, a cell tower 106, a DSN platform 107, a first gateway 108, a second gateway 109, and a third gateway 110. Those skilled in the art will realize that the use of three gateways is purely illustrative and the network can comprise any number of gateways while remaining within the scope of the present disclosure.

The first mobile device 102 has not subscribed to the current DISPEL privacy service. Arrow A shows the flow of an http request sent by the first mobile device 102 when a user clicks on a webpage using the first mobile device 102. As shown, when the first mobile device 102 sends a first http request to the WCP host 105, the request accesses the network via DSN 106. The request is then processed by the DSN platform 107. Since the first user is not subscribed to the DISPEL service, the DSN platform 107 does not enter the XFT header. Instead, the request is forwarded to the WCP host 105 without passing through the DISPEL gateways but instead further actions are delegated to additional gateways provided by third parties. The flow of an http request along path A may travel through other network nodes and/or third-party gateways (not shown). Thus, when a user accesses the WCP host 105 via the first mobile device 102, the user's identity and information may be discovered and tracked by WCPs and other interested parties.

Arrow B shows the flow of an http request sent by the second mobile device 103 that is subscribed to the current DISPEL privacy service. The second mobile device's 103 subscription is processed by a backoffice system 104 and then communicated to the DSN platform 107. Thus, when a user clicks on the webpage and a second http request is sent via the DSN 106 to the DSN platform 107, the DSN platform 107 recognizes that the second http request is coming from a DISPEL subscribed mobile device. In accord, the DSN platform 107 will enter an XFT header into the second http request. The XFT header will contain an XFT list comprising, in order, the specific DISPEL gateways (108, 109, 110) through which the http request must travel before reaching the WCP host 105. The DISPEL gateways (108, 109, 110) are configured to perform various privacy information control functionalities. The DISPEL gateways may be controlled by the communications service provider and configured to support the DISPEL architecture.

Thus, upon entering the XFT header into the second http request, the DSN platform 107 will thereafter send the second http request to the particular DISPEL gateway that is listed first in the XFT list (namely, the first gateway 108). This first gateway 108 is configured to perform a first privacy information control functionality. In the particular embodiment shown in FIG. 1, the first privacy information control functionality comprises a cleansing function of searching for and extracting cookies. After cleansing the second http request and extracting any identified cookies, the first gateway 108 then analyzes the XFT list in order to determine the next gateway. The first gateway 108 discovers that the subsequent gateway after itself is the second gateway 109. Accordingly, the first gateway 108 forwards the second http request to the second gateway 109.

Upon receiving the second http request, the second gateway 109 performs a second privacy information control functionality. The second privacy information control functionality may be the same as or different from that of the first. In the particular embodiment shown in FIG. 1, the second privacy information control functionality is different from the first privacy information control functionality, and the second privacy information control functionality comprises anonymizing the second http request. After making the second http request anonymous, the second gateway 109 analyzes the XFT list in order to determine the next gateway. The second gateway 109 discovers that the subsequent gateway after itself is the third gateway 110. Accordingly, the second gateway 109 forwards the second http request to the third gateway 110.

The third gateway 110 is configured to perform an information security checkpoint functionality prior to performing a privacy information control functionality. It is to be understood that although the FIG. 1 embodiment comprises a third gateway 110 that performs the security checkpoint functionality, any of the gateways in the data network may perform such functionality. Also, any number of gateways (ranging from none of the gateways to all of the gateways) within the data network may be configured to perform the security checkpoint functionality.

The security checkpoint functionality will now be described. Upon receiving the second http request, the third gateway 110 compares the XFT header to the second http request in search of inconsistencies between the two. More particularly, the third gateway 110 analyzes the XFT header to learn where the second http request should have been prior to its arrival, while also scanning the second http request for evidence to determine where it in fact was prior to its arrival. In the FIG. 1 embodiment, the third gateway 110 would learn from reading the XFT header that the second http request should have traveled from the DSN platform directly to the first gateway 108, from the first gateway 108 directly to the second gateway 109, and from the second gateway 109 directly to the third gateway 110.

The third gateway 110 then analyzes the second http request to make sure that it in fact traveled from the first gateway 108 to the second gateway 109, and then to the third gateway 110 in the correct order. The third gateway 110 also searches for evidence of any routing that was not supposed to take place to determine whether the second http request traveled through any other gateways besides those specified in the XFT list (i.e., besides the first, second, and third gateways). If the third gateway 110 finds that the second http request traveled through other gateways besides those listed in the XFT list, then it could very well be due to a security breach (e.g., a WCP may have intercepted the second http request in order to reverse the anonymizer's functionality, embed scripts, etc.). Thus, based on a finding that the second http request did not travel in the path described by the XFT list, the third gateway 110 will reject the second http request, thereby preventing the user from accessing the mobile advertisement site. If, on the other hand, the third gateway 110 determines that the second http request traveled according to the XFT list, then the third gateway 110 will accept the second http request.

Upon accepting the second http request, the third gateway 110 then performs a third privacy information control functionality. The third privacy information control functionality may be the same as or different from that of the first and/or second. In the particular embodiment shown in FIG. 1, the third privacy information control functionality is different from both the first privacy information control functionality and the second privacy information control functionality, and the third privacy information control functionality comprises a cleansing function of ridding the http message of embedded scripts. After detecting and extracting any embedded scripts from the second http request, the third gateway 110 analyzes the XFT list in order to determine the next gateway. The third gateway 110 discovers that it is the last gateway in the XFT list. Accordingly, the third gateway 110 forwards the http request to the WCP host 105.

By the time the second http request reaches the WCP host 105, it has gone through the plurality of gateways (108, 109, 110) and has experienced the several information control functionalities. Thus, when the second http request reaches the WCP host 105, the user's identity and information are anonymous and untrackable to the WCP.

The plurality of gateways (108, 109, 110) may be reconfigurable to perform various control functionalities. For example, the second gateway 109 may perform the anonymizing control functionality for a period of time until a user reconfigures the second gateway 109, at which point the second gateway 109 may discontinue performing the anonymizing control functionality and begin performing a cleansing control functionality instead. In some embodiments, a user may pre-program a reconfiguration to take place. For example, a user may program the second gateway 109 so that it performs an anonymizing control functionality for a predetermined period of time, and at the end of the predetermined period of time, the second gateway 109 automatically reconfigures itself such that it no longer performs the anonymizing control functionality but instead performs a cleansing control functionality.

The plurality of gateways (108, 109, 110) may also be reconfigurable to either perform or not perform an information security checkpoint functionality. For example, in the scenario illustrated in FIG. 1, the second gateway 109 may be reconfigurable to begin performing an information security checkpoint functionality. Thus, while the system comprised only the third gateway 110 performing the security checkpoint functionality for a first period of time, a user may reconfigure the second gateway 109 such that both the second gateway 109 and the third gateway 110 perform the information security checkpoint functionality. Likewise, a user may reconfigure the third gateway 109 to stop performing the security checkpoint functionality.

In some embodiments, a user may pre-program a reconfiguration to take place. For example, a user may program the second gateway 109 so that it does not perform an information security checkpoint functionality for a predetermined period of time, and at the end of the predetermined period of time, the second gateway 109 automatically reconfigures itself such that it begins performing the information security checkpoint functionality. With the above described reconfiguration capability, the disclosed system may seamlessly adapt to the evolving security needs of users without requiring any modifications in infrastructure.

Figure 2:
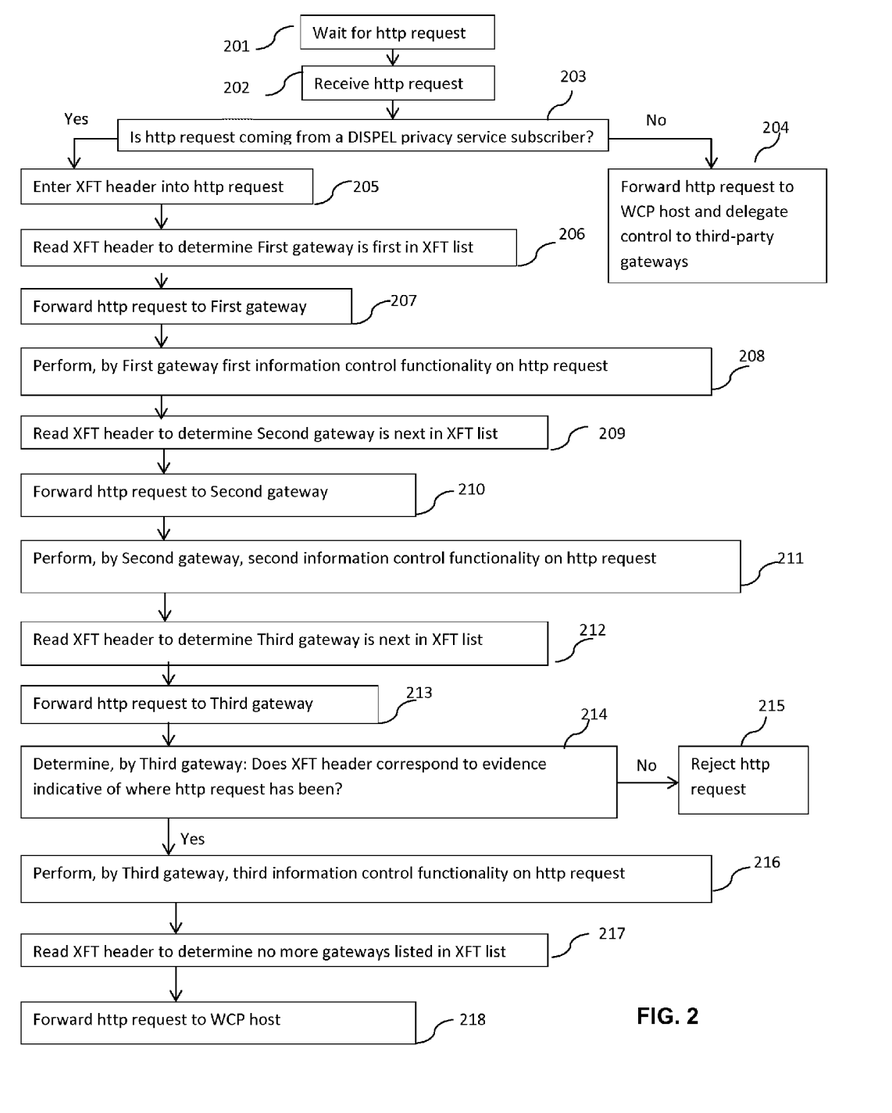
FIG. 2 is a flow chart of a method according to an embodiment of the disclosure.

In FIG. 2, described is a flow chart of a DISPEL data network according to the FIG. 1 embodiment. In step 201, the DSN platform 107 waits for an http request from a mobile device. At step 202, the DSN platform 107 receives from a mobile device an http request to access content from a WCP. In step 203, the DSN platform 107 determines whether the http request is coming from a mobile device that is subscribed to a DISPEL privacy service. If the http request is not coming from a mobile device that is subscribed to a DISPEL privacy service, then the sequence moves to step 204, and the http request is forwarded to the WCP host without going through the communication service provider's DISPEL gateways, but instead the communication service provider may delegate control over the http request to third parties.

If the http request is coming from a mobile device that is subscribed to a DISPEL privacy service, then the sequence moves to step 205, and the DSN platform 107 enters an XFT header into the http request. At step 206, the DSN platform 107 reads the XFT header and determines that the first gateway 108 is listed first in the XFT list. Thus, at step 207, the DSN platform 107 forwards the http request to the first gateway 108. At step 208, the first gateway 108 performs a first information control functionality on the http request.

At step 209, the first gateway 108 reads the XFT header and determines the second gateway 109 is listed next after itself in the XFT list. At step 210, the first gateway 108 forwards the http request to the second gateway 109. At step 211, the second gateway 109 performs a second information control functionality on the http request. At step 212, the second gateway 109 reads the XFT header and determines that the third gateway 110 is listed next after itself in the XFT list. At step 213, the second gateway 109 forwards the http request to the third gateway 110. At step 214 the third gateway 110 performs a security checkpoint functionality and determines whether the http request's XFT header corresponds to evidence indicative of where the http has been (i.e., the third gateway 110 analyzes the XFT header to learn where the http request should have been prior to its arrival, while also scanning the http request for evidence to determine where it in fact was prior to its arrival).

If the third gateway 110 determines that the http request's XFT header does not correspond to evidence indicative of where the http has been, then the third gateway 110 rejects the http request. If the third gateway 110 determines that the http request's XFT header corresponds to evidence indicative of where the http has been, then the third gateway 110 accepts the http request and the sequence continues to step 216. At step 216, the third gateway 110 performs a third information control functionality on the http request. At step 217, the third gateway 110 reads the XFT header and determines that it is the last gateway listed in the XFT list. At step 218, the third gateway 110 forwards the http request to the WCP host 105.

Figure 3:
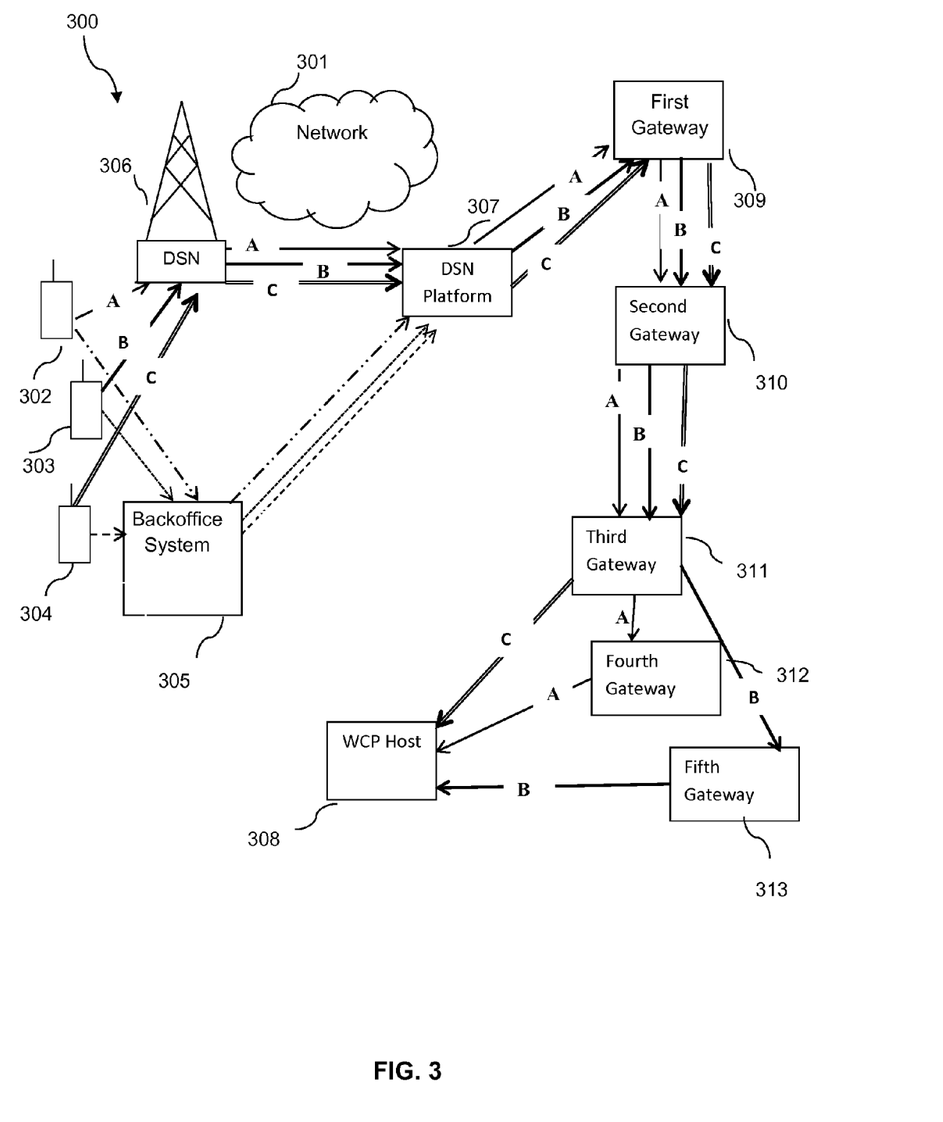
FIG. 3 is a block diagram of data network comprising dynamic insertion of service-specific privacy-proxy elements (DISPEL) architecture according to another embodiment of the disclosure.

FIG. 3 shows how a data network 301 implementing DISPEL architecture 300 can be configured to provide various types of security settings to a broad range of mobile device users. As shown, the data network 301 comprises five gateways (309, 310, 311, 312, 313), wherein each gateway performs a particular privacy information control functionality. A first mobile device 302 subscribes to a first DISPEL privacy service, a second mobile device 303 subscribes to a second DISPEL privacy service, and a third mobile device 304 subscribes to a third DISPEL privacy service, wherein the first service, the second service, and the third service are all different from one another. For example, in the particular embodiment shown in FIG. 3, the first DISPEL service is a child protection service, while the second DISPEL service is a government security service, while the third DISPEL service is a basic customer protection service. FIG. 3 shows a first http request's flow path (represented by arrow A) as it travels from the first mobile device 302 to a WCP host 308 via the first DISPEL privacy service. Arrow B depicts a second http request's flow path as it travels from the second mobile device 303 to a WCP host 308 via the second DISPEL privacy service. Arrow C depicts a third http request's flow path as it travels from the third mobile device 304 to a WCP host 308 via the third DISPEL privacy service.

The plurality of gateways through which an http request travels is tailored according to the particular DISPEL service for which the user has subscribed. Thus, in FIG. 3, although the first, second, and third http requests all travel from the DSN platform to the WCP host, each takes a different route through the data network to reach the WCP host. The first http request will travel through gateways designed to protect children for safety purposes as well as to provide them with extra protection against WCPs. The second http request will travel through gateways configured to protect government communications against security breaches. The third http request will travel through the basic gateways configured to protect consumers against WCPs that track mobile users.

FIG. 3 shows a first gateway 309, which performs a cleansing function of searching for and extracting cookies from an http message; a second gateway 310, which performs an anonymizing function; a third gateway 311, which performs a cleansing function of detecting and extracting embedded scripts from an http message; a fourth gateway 312, which enforces child protection legislation; and a fifth gateway 313, which protects government communications. Those skilled in the art will appreciate that the description of child protection legislation and government security directives are only two examples of the numerous reasons for which the data network may include specifically tailored proxy servers, and the proxy servers can be tailored in accordance with virtually any particular need for special and/or heightened security. Moreover, those skilled in the art will realize that the use of three gateways is purely illustrative and the network can comprise any number of gateways while remaining within the scope of the present invention.

Arrow A represents the path of a first http request as a first mobile device 302 attempts to access web content. In the particular embodiment shown in FIG. 3, the first mobile device 302 is subscribed to a child protection DISPEL privacy service. The first mobile device's subscription is processed by a backoffice system 305 and then communicated to the DSN platform 307. The backoffice system 305 may comprise a record-keeping database configured to store information relating to user subscriptions and communicate such information to the DSN platform 307. Thus, in the scenario represented in FIG. 3, information regarding the first mobile device's subscription to the child protection DISPEL privacy service is stored in the backoffice system 305 and communicated to the DSN platform 307. In accord, when a user attempts to open a webpage on the first mobile device and a first http request is sent via the DSN 306 to the DSN platform 307, the DSN platform 307 recognizes that the first http request is coming from a mobile device subscribed to a child protection DISPEL privacy service. In accord, the DSN platform 307 will enter a child protection XFT header into the first http request. The child protection XFT header will contain an XFT list comprising, in order, the specific plurality of DISPEL gateways through which the http request must travel before reaching the WCP host. The plurality of DISPEL gateways are configured to perform various privacy information control functionalities, specifically tailored to enforce child privacy legislation. In the FIG. 3 embodiment, the plurality of DISPEL gateways (309, 310, 311, 312) are specifically tailored by way of the inclusion of the fourth gateway 312, which is configured to enforce child privacy legislation. Thus, the plurality of gateways included in the XFT list comprises the first gateway 309, the second gateway 310, the third gateway 311, and the fourth gateway 312. The gateways can be regularly updated in order to stay up-to-date with the current legislation and enforcement directives.

Upon entering the XFT header into the first http request via the DSN 306, then the DSN platform 307 will thereafter send the first http request to the particular DISPEL gateway that is listed first in the XFT list. This first gateway 309 is configured to perform a first privacy information control functionality, which comprises cleansing an http message by searching for and extracting cookies. After cleansing any cookies from the first http request, the first gateway 309 then analyzes the XFT list and determines that the next gateway is the second gateway 310. Accordingly, the first gateway 309 forwards the first http request to the second gateway 310.

Upon receiving the first http request, the second gateway 310 performs a second privacy information control functionality, which comprises anonymizing the first http request. Thereafter the second gateway 310 analyzes the XFT list and discovers that the subsequent gateway after itself is the third gateway 311. Accordingly, the second gateway 310 forwards the first http request to the third gateway 311.

Upon receiving the first http request, the third gateway 311 performs a third privacy information control functionality, which comprises cleansing the first http request by ridding the first http request of embedded scripts. After detecting and extracting any embedded scripts from the first http request, the third gateway 311 analyzes the XFT list and determines that the next gateway is the fourth gateway 312. Thus, the third gateway 311 forwards the http request to the fourth gateway 312.

The fourth gateway 312 is configured to enforce child privacy legislation. Therefore, upon receiving the first http request, the fourth gateway 312 performs its privacy information control functionality, which is specifically configured to enforce child privacy directives. Thereafter, the fourth gateway 312 scans the XFT list and determines that it is the last gateway in the XFT list. Accordingly, the fourth gateway 312 forwards the first http request to the WCP host 308.

It is to be well understood that any of the gateways can also be configured to also serve as a security check-points, as described in the description of FIG. 1 above.

By the time the first http request reaches the WCP host 308, it has gone through the plurality of gateways (309, 310, 311, 312) and has thus experienced the several information control functionalities. Thus, when the first http request reaches the WCP host 308, the user's identity and information are anonymous and untrackable to the WCP. Moreover, the first http request has undergone more stringent security screening as it has traveled through the fourth gateway 312.

Arrow B represents the path of a second http request as a second mobile device 303 attempts to access web content. In the particular embodiment shown in FIG. 3, the second mobile device 303 is a government mobile device that is subscribed to a government DISPEL privacy service. Thus, information regarding the second mobile device's subscription to the government DISPEL privacy service may be stored and processed in the backoffice system 305 and communicated to the DSN platform 307. In accord, when a user clicks to access a webpage on the second mobile device 303, a second http request is sent via the DSN 306 to the DSN platform 307, the DSN platform 307 recognizes that the second http request is coming from a government DISPEL subscribed mobile device. In accord, the DSN platform 307 will enter a government security XFT header into the second http request. The government security XFT header will contain an XFT list comprising, in order, the specific plurality of DISPEL gateways through which the http request must travel before reaching the WCP host 308. The plurality of DISPEL gateways are configured to perform various privacy information control functionalities, specifically tailored to protect government communications. In the FIG. 3 embodiment, the plurality of DISPEL gateways (309, 310, 311, 313) are specifically tailored by way of the inclusion of the fifth gateway 313, which is configured to enforce current government security policies. Thus, the plurality of gateways included in the XFT list comprises the first gateway 309, the second gateway 310, the third gateway 311, and the fifth gateway 313. The fifth gateway 313 can be regularly updated in order to stay up-to-date with the current policy directives.

Upon entering the XFT header into the second http request, the DSN platform 307 will thereafter send the second http request to the first gateway 309 since it is listed first in the XFT list. The first gateway 309 is configured to perform the cleansing function of extracting cookies. After extracting cookies from the second request, the first gateway 309 then analyzes the XFT list and determines that the next gateway is the second gateway 310. Accordingly, the first gateway 309 forwards the second http request to the second gateway 310.

Upon receiving the second http request, the second gateway 310 anonymizes the second http request. Thereafter the second gateway 310 analyzes the XFT list and discovers that the subsequent gateway after itself is the third gateway 311. Accordingly, the second gateway 310 forwards the second http request to the third gateway 310.

Upon receiving the second http request, the third gateway 311 rids the second http request of embedded scripts. After detecting and extracting any embedded scripts from the second http request, the third gateway 311 analyzes the XFT list in order to determine the next gateway. Accordingly, the third gateway 311 forwards the second http request to the fifth gateway 313. The fifth gateway 313 performs its privacy information control functionality, which comprises the enforcement of government communications security measures. After the fifth gateway has completed its functionality, the fifth gateway 313 discovers that it is the last gateway in the XFT list. Thus, the fifth gateway 313 forwards the second http request to the WCP host 308.

It is to be well understood that any of the gateways can be configured to also serve as a security check-points, as described in the description of FIG. 1 above.

By the time the second http request reaches the WCP host 308, it has gone through the plurality of gateways (309, 310, 311, 313) and has thus experienced the several information control functionalities. Thus, when the second http request reaches the WCP host 308, the user's identity and information are anonymous and untrackable to the WCP. Moreover, the second http request has undergone highly stringent security screening as it has traveled through the fifth gateway 313.

Arrow C represents the path of a third http request as a third mobile device 304 attempts to access web content. The third mobile device 304 is subscribed to a basic DISPEL privacy service, and the subscription is processed by a backoffice system 305. Thus, information regarding the third mobile device's subscription to the basic DISPEL privacy service is stored in the backoffice system 305 and communicated to the DSN platform 307. In accord, when the third user clicks on a webpage on the third mobile device 304 and a third http request is sent via the DSN 306 to the DSN platform 307, the DSN platform 307 recognizes that the third http request is coming from a basic DISPEL subscribed mobile device. In accord, the DSN platform 307 will enter a basic XFT header into the third http request. The basic XFT header will contain an XFT list comprising, in order, the specific plurality of DISPEL gateways through which the http request must travel before reaching the WCP host 308. The plurality of DISPEL gateways are configured to perform various privacy information control functionalities. In the particular FIG. 3 embodiment, the plurality of gateways included in the XFT list comprises the first gateway 309, the second gateway 310, and the third gateway 311.

Upon entering the XFT header into the third http request, the DSN platform 307 will thereafter send the third http request to the first gateway 309 since it is listed first in the XFT list. The first gateway 309 is configured to perform the cleansing function of extracting cookies. After extracting cookies from the third http request, the first gateway 309 then analyzes the XFT list and determines that the next gateway is the second gateway 310. Accordingly, the first gateway 309 forwards the third http request to the second gateway 310.

Upon receiving the third http request, the second gateway 310 anonymizes the third http request. Thereafter the second gateway 310 analyzes the XFT list and thereby discovers that the subsequent gateway after itself is the third gateway 311. Accordingly, the second gateway 310 forwards the third http request to the third gateway 311.

Upon receiving the third http request, the third gateway 311 rids the second http request of embedded scripts. After detecting and extracting the embedded scripts from the second http request, the third gateway 311 analyzes the XFT list in order to determine the next gateway. The third gateway 311 discovers that it is the last gateway in the XFT list. Thus, the third gateway forwards the third http request to the WCP host 308.

It is to be well understood that any of the gateways can be configured to also serve as a security check-points, as described in the description of FIG. 1 above.

By the time the third http request reaches the WCP host 308, it has gone through the plurality of gateways and has thus experienced the several information control functionalities. Thus, when the third http request reaches the WCP host 308, the user's identity and information are anonymous and untrackable to the WCP.

Any of the gateways (309-313) may be reconfigurable to perform various control functionalities. For example, the second gateway 310 may perform the anonymizing control functionality for a period of time until a user reconfigures the second gateway 310, at which point the second gateway 310 may discontinue performing the anonymizing control functionality and begin instead performing a control functionality comprising the enforcement of government communications security measures. In some embodiments, a user may preprogram a reconfiguration to take place. For example, a user may program the second gateway 310 so that it performs an anonymizing control functionality for a predetermined period of time, and at the end of the predetermined period of time, the second gateway 310 automatically reconfigures itself such that it no longer performs the anonymizing control functionality but instead performs the government security functionality.

Figure 4:
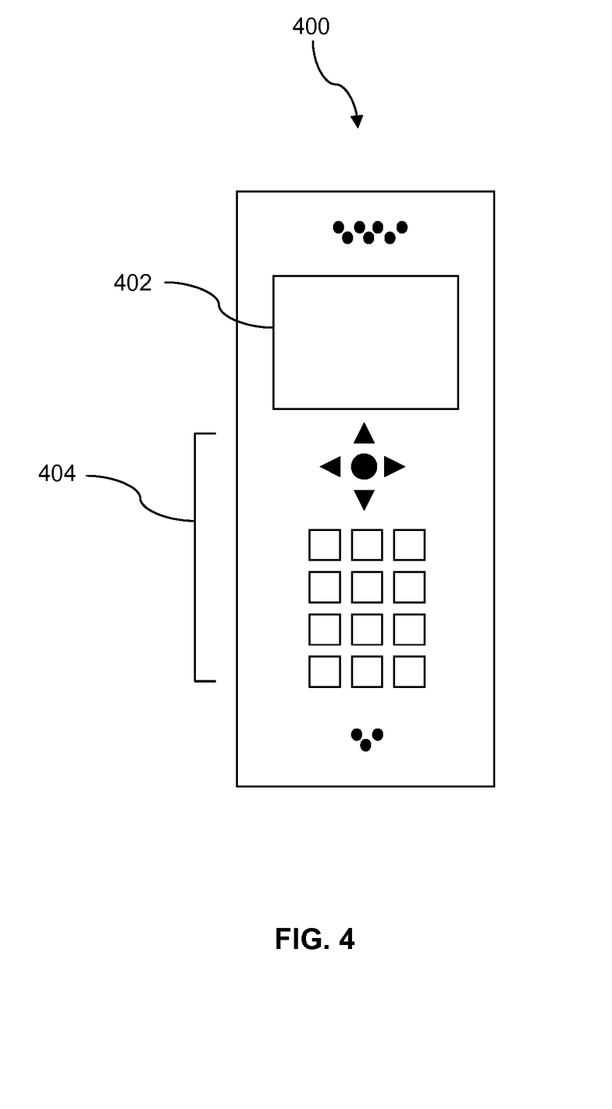
FIG. 4 is a block diagram of a mobile communication device according to an embodiment of the disclosure.

Turning now to FIG. 4, a wireless communications system including the mobile device 400 is described. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a webpage. The webpage may be obtained via wireless communications with a base transceiver station, a wireless network access node, a peer mobile device 400 or any other wireless communication network or system.

Figure 5:
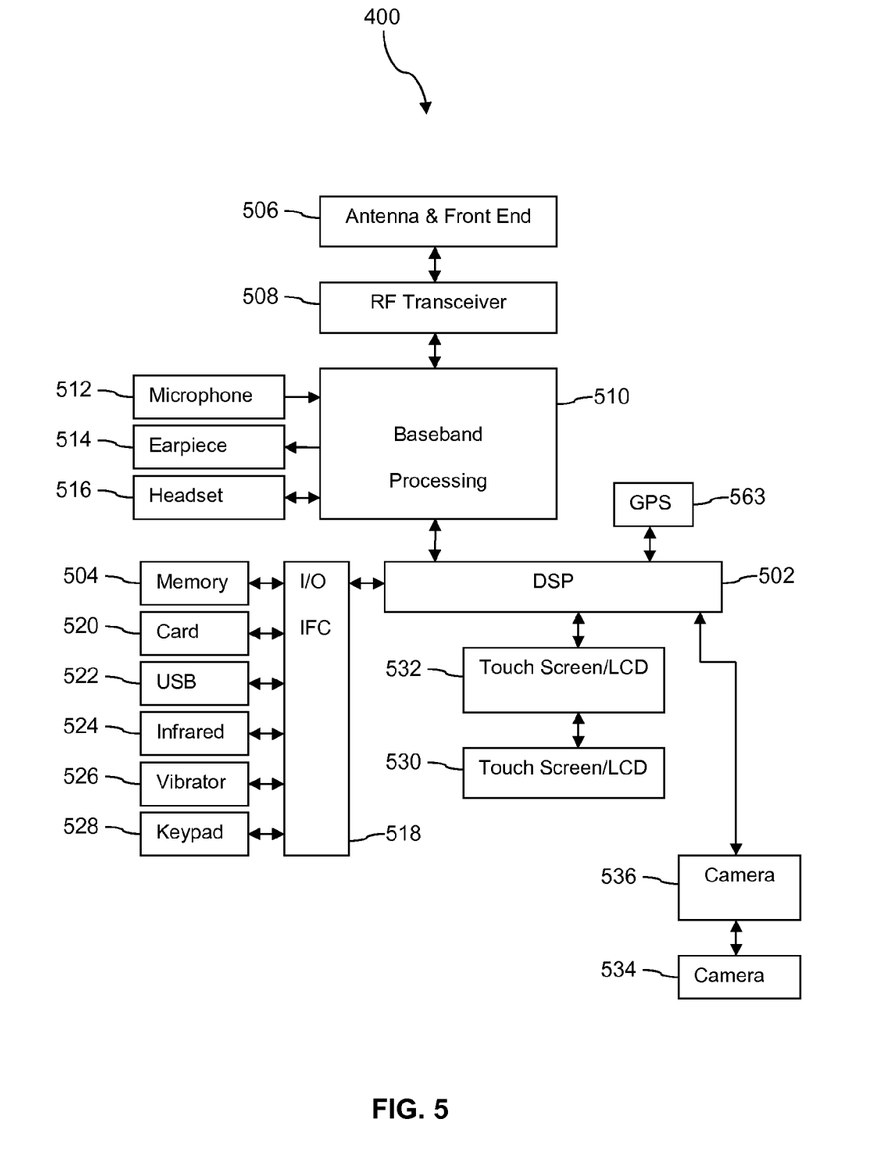
FIG. 5 is a block diagram of a mobile device according to an embodiment of the disclosure.

Turning now to FIG. 5, a block diagram of the mobile device 400 is described. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
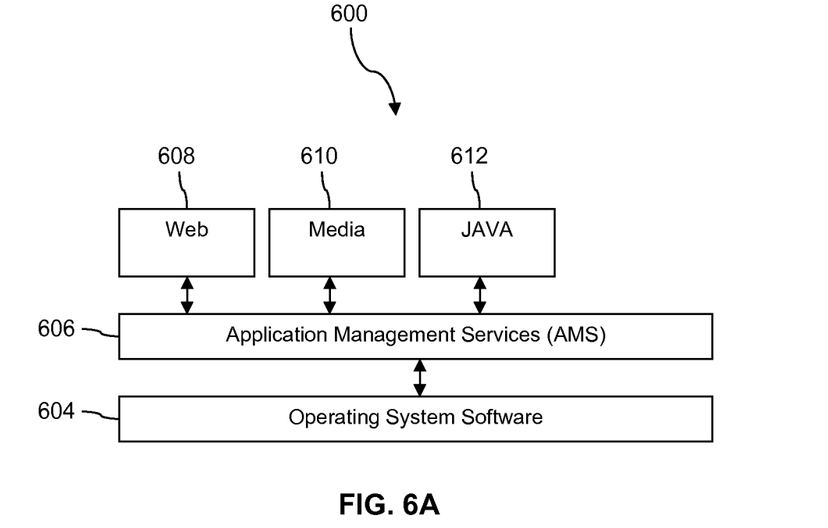
FIG. 6A is a block diagram of a software architecture of a mobile communication device according to an embodiment of the disclosure.

Turning now to FIG. 6A, a software environment 600 that may be implemented by the DSP 502 is described. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view webpages. The media player application 610 may be executed by the mobile device 400 to play audio or audiovisual media. The JAVA applets 612 may be executed by the mobile device 400 to provide a variety of functionality including games, utilities, and other functionality.

Figure 6B:
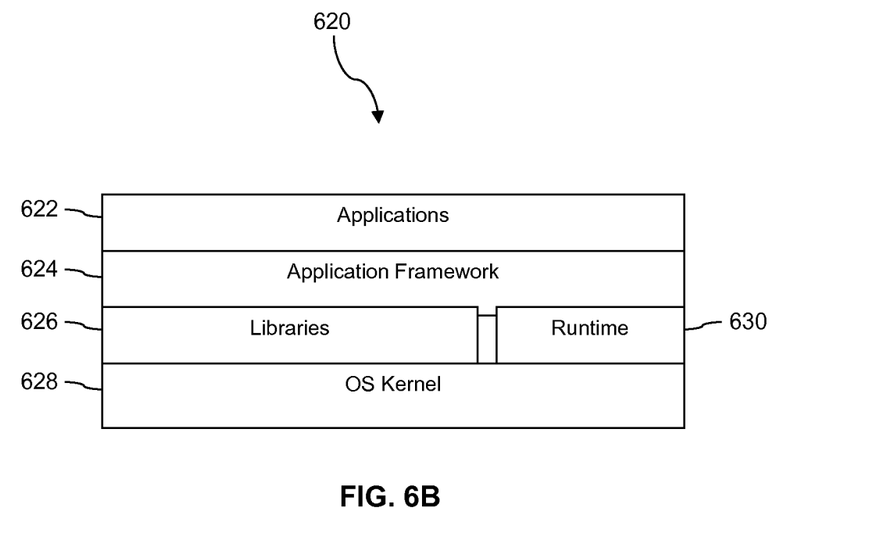
FIG. 6B is a block diagram of another software architecture of a mobile communication device according to an embodiment of the disclosure.

Turning now to FIG. 6B, an alternative software environment 620 that may be implemented by the DSP 502 is described. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
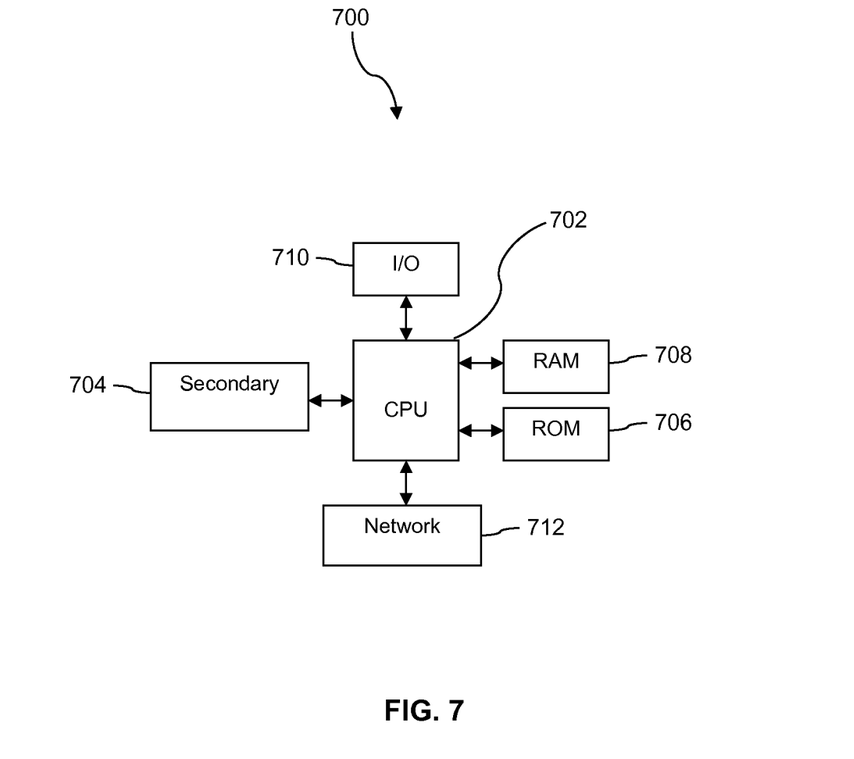
FIG. 7 is a block diagram of a computer system according to an embodiment of the disclosure.

Turning now to FIG. 7, a computer system 700 suitable for implementing one or more embodiments disclosed herein is described. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software because re-spinning a hardware implementation is more expensive than re-spinning a software design. Generally, a design that is stable and will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner that a machine controlled by a new ASIC is a particular machine or apparatus, a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if the RAM 708 is not large enough to hold all working data. The secondary storage 704 may be used to store programs which are loaded into the RAM 708 when such programs are selected for execution. The ROM 706 is used to store instructions and perhaps data which are read during program execution. The ROM 706 is a non-volatile memory device which typically has a small memory capacity relative to the larger memory capacity of the secondary storage 704. The RAM 708 is used to store volatile data and perhaps to store instructions. Access to both the ROM 706 and the RAM 708 is typically faster than to the secondary storage 704. The secondary storage 704, the RAM 708, and/or the ROM 706 may be referred to in some contexts as computer readable storage media and/or non-transitory computer readable media.

The I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using the processor 702, may be received from and outputted to the network, for example, in the form of a computer data signal embodied in a carrier wave.

Such information, which may include data or instructions to be executed using the processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk-based systems may all be considered secondary storage 704), the ROM 706, the RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708 likewise may be referred to as a non-transitory computer readable medium in that, while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing security settings for multiple mobile device users, comprising:

receiving, by a data service node platform, a first http message from a first mobile device, wherein the first http message is directed to a first web content provider host;

determining, by the data service node platform, whether the first mobile device is associated with a privacy service subscription;

based on a determination that the first mobile device is associated with an anonymizing privacy service subscription, inserting, by the data service node platform, an anonymizing forward-to (XFT) header into the first http message, wherein the anonymizing XFT header contains an anonymizing XFT list, and wherein the anonymizing XFT list comprises a list of anonymizing gateways comprising an anonymizing gateway and an embedded-scripts-extracting gateway;

determining, by the data service node platform, that the anonymizing gateway is listed first in the anonymizing XFT list;

based on the determination that the anonymizing gateway is listed first in the anonymizing XFT list, forwarding, by the data service node platform, the first http message to the anonymizing gateway;

receiving, by the anonymizing gateway, the first http message;

performing, by the anonymizing gateway, an anonymizing privacy information control functionality on the first http message comprising making the first http message anonymous;

determining, by the anonymizing gateway, that the embedded-scripts-extracting gateway is designated as a next gateway in the anonymizing XFT list;

based on the determination that the embedded-scripts-extracting gateway is designated as the next gateway in the anonymizing XFT list, forwarding, by the anonymizing gateway, the first http message to the embedded-scripts-extracting gateway;

receiving, by the embedded-scripts-extracting gateway, the first http message;

performing, by the embedded-scripts-extracting gateway, an embedded-scripts-extracting privacy information control functionality on the first http message comprising searching for and extracting embedded scripts from the first http message;

determining, by the embedded-scripts-extracting gateway, whether another gateway is listed after the embedded-scripts-extracting gateway in the anonymizing XFT list;

based on the determination that the embedded-scripts-extracting gateway is listed last in the anonymizing XFT list, forwarding the first http message to the first web content provider host;

receiving, by the data service node platform, a second http message from a second mobile device, wherein the second http message is directed to a second web content provider host;

determining, by the data service node platform, whether the second mobile device is associated with a privacy service subscription;

based on a determination that the second mobile device is associated with a child-protection privacy service subscription, inserting, by the data service node platform, a child-protection forward-to (XFT) header into the second http message, wherein the child-protection XFT header contains a child-protection XFT list, and wherein the child-protection XFT list comprises a list of child-protection gateways comprising a child-protection gateway and a cookie-extracting gateway;

determining, by the data service node platform, that the child-protection gateway is listed first in the child-protection XFT list;

based on the determination that the child-protection gateway is listed first in the child-protection XFT list, forwarding, by the data service node platform, the second http message to the child-protection gateway;

receiving, by the child-protection gateway, the second http message;

performing, by the child-protection gateway, a child-protection privacy information control functionality on the second http message comprising acting on the second http message to comply with one or more child privacy rules;

determining, by the child-protection gateway, that the cookie-extracting gateway is designated as a next gateway in the child-protection XFT list;

based on the determination that the cookie-extracting gateway is designated as the next gateway in the child-protection XFT list, forwarding, by the child-protection gateway, the second http message to the cookie-extracting gateway;

receiving, by the cookie-extracting gateway, the second http message;

performing, by the cookie-extracting gateway, a cookie-extracting privacy information control functionality on the second http message comprising searching for and extracting cookies from the second http message;

determining, by the cookie-extracting gateway, whether another gateway is listed after the cookie-extracting gateway in the child-protection XFT list; and based on the determination that the cookie-extracting gateway is listed last in the child-protection XFT list, forwarding the second http message to the second web content provider host.

2. The method of claim 1, wherein the data service node platform, the anonymizing gateway, the embedded-scripts-extracting gateway, the child-protection gateway, and the cookie-extracting gateway are controlled by a communications service provider.

3. The method of claim 1, further comprising:

sending, by an unsubscribed mobile device, a third http message, wherein the third http message is directed to a third web content provider host;

receiving, by the data service node platform, the third http message from the unsubscribed mobile device;

determining, by the data service node platform, that the unsubscribed mobile device is not associated with any privacy service subscription; and based on the determination that the unsubscribed mobile device is not associated with any privacy service subscription, sending the third http message without inserting an XFT header into the third http message.

4. The method of claim 1, wherein at least one of the embedded-scripts-extracting gateway or the cookie-extracting gateway exercises a security check-point functionality, wherein the security checkpoint functionality comprises:

scanning, by the at least one of the embedded-scripts-extracting gateway or the cookie-extracting gateway, at least one of the anonymizing XFT list and the child-protection XFT list;

scanning, by the at least one of the embedded-scripts-extracting gateway or the cookie-extracting gateway, at least one of the first http message or the second http message for evidence indicative of where the at least one of the first http message or the second http message has traveled;

comparing, by the at least one of the embedded-scripts-extracting gateway or the cookie-extracting gateway, the evidence indicative of where the at least one of the first http message or the second http message has traveled with the at least one of the anonymizing XFT list and the child-protection XFT list;

finding, by the at least one of the embedded-scripts-extracting gateway or the cookie-extracting gateway, that the at least one of the first http message or the second http message has traveled according to the route designated by at least one of the anonymizing XFT header or the child-protection XFT header in response to the evidence indicative of where the at least one of the first http message or the second http message has traveled correlating with the at least one of the anonymizing XFT list and the child-protection XFT list;

finding, by the at least one of the embedded-scripts-extracting gateway or the cookie-extracting gateway, that the at least one of the first http message or the second http message has not traveled according to the route designated by the at least one of the anonymizing XFT header or the child-protection XFT header in response to the evidence indicative of where the at least one of the first http message or the second http message has traveled not correlating with the at least one of the anonymizing XFT list and the child-protection XFT list;

based on a finding that the at least one of the first http message or the second http message has traveled according to the route designated by the at least one of the anonymizing XFT header or the child-protection XFT header, performing, by the at least one of the embedded-scripts-extracting gateway or the cookie-extracting gateway, the corresponding privacy information control functionality; and based on a finding that the at least one of the first http message or the second http message has not traveled according to the route designated by the at least one of the anonymizing XFT header or the child-protection XFT header, rejecting, by the at least one of the embedded-scripts-extracting gateway or the cookie-extracting gateway, the at least one of the first http message or the second http message.

5. The method of claim 4, wherein upon the at least one of the embedded-scripts-extracting gateway or the cookie-extracting gateway rejecting the at least one of the first http message or the second http message, the at least one of the first http message or the second http message discontinues its travel and does not arrive at at least one of the first web content provider host or the second web content provider host, thereby preventing a user of at least one of the first mobile device or the second mobile device from accessing the at least one of the first web content provider host or the second web content provider host.

6. The method of claim 1, wherein the anonymizing XFT list comprises listing the anonymizing gateway and the embedded-script-extracting gateway in a sequential order, and wherein the child-protection XFT list comprises listing the child-protection gateway and the cookie-extracting gateway in a sequential order.

7. The method of claim 1, wherein at least one of: the anonymizing gateway is reconfigurable to perform a different privacy information control functionality other than the anonymizing privacy information control functionality; the embedded-scripts-extracting gateway is reconfigurable to perform a different privacy information control functionality other than the embedded-scripts-extracting information privacy control functionality; the child-protection gateway is reconfigurable to perform a different privacy information control functionality other than the child-protection privacy information control functionality; or the cookies-extracting gateway is reconfigurable to perform a different privacy information control functionality other than the cookies-extracting privacy information control functionality.

8. The method of claim 1, wherein the child-protection privacy information control functionality performed by the child-protection gateway is updated according to updated child privacy rules so that the child-protection gateway complies with the updated child privacy rules.

9. The method of claim 1, further comprising receiving, by the data service node platform, notification of the anonymizing privacy service subscription and the child-protection privacy service subscription from a backoffice system.

10. The method of claim 1, wherein at least one of the anonymizing gateway, the embedded-scripts-extracting gateway, the child-protection gateway, or the cookies-extracting gateway is reconfigurable to serve as a government security gateway configured to perform information control functionalities to protect government communications.

11. A method for protecting the identity of a mobile device user, comprising:
    receiving, by a data service node platform, an http message from a mobile device, wherein the http message is directed to a web content provider host;
    determining, by the data service node platform, whether the mobile device is associated with a privacy service subscription;
    based on a determination that the mobile device is associated with the privacy service subscription, inserting, by the data service node platform, a forward-to (XFT) header into the http message, wherein the XFT header contains an XFT list, and wherein the XFT list comprises a list of gateways comprising an anonymizing gateway and a cleansing gateway;
    determining, by the data service node platform, that the anonymizing gateway is designated as a first gateway in the XFT list;
    based on the determination that the anonymizing gateway is designated as the first gateway in the XFT list, forwarding, by the data service node platform, the http message to the anonymizing gateway;
    receiving, by the anonymizing gateway, the http messages;
    performing, by the anonymizing gateway, an anonymizing privacy information control functionality on the http message;
    determining, by the anonymizing gateway, that the cleansing gateway is next in the XFT list;
    based on the determination that the cleansing gateway is next in the XFT list, forwarding, by the anonymizing gateway, the http message to the cleansing gateway;
    receiving, by the cleansing gateway, the http message;
    scanning, by the cleansing gateway, the XFT list;
    scanning, by the cleansing gateway, the http message for evidence indicative of where the http has traveled;
    comparing, by the cleansing gateway, the evidence indicative of where the http message has traveled with the XFT list;
    finding, by the cleansing gateway, that the http message has traveled according to the route designated by the XFT header in response to the evidence indicative of where the http message has traveled correlating with the XFT list;
    finding, by the cleansing gateway, the http message has not traveled according to the route designated by the XFT header in response to the evidence indicative of where the http message has traveled not correlating with the XFT list; and
    based on a finding that the http message has traveled according to the route designated by the XFT header:
        performing, by the cleansing gateway, a cleansing privacy information control functionality on the http message;
        determining, by the cleansing gateway, whether another gateway is listed after the cleansing gateway in the XFT list; and based on the determination that the cleansing gateway is listed last in the XFT list, forwarding, by the cleansing gateway, the http message to the web content provider host; and based on a finding that the http message has not traveled according to the route designated by the XFT header, rejecting, by the cleansing gateway, the http message.

12. The method of claim 11, wherein upon the cleansing gateway rejecting the http message, the http message discontinues its travel and does not arrive at the web content provider host, thereby preventing the mobile device user from accessing the web content provider host.

13. The method of claim 11, wherein the data service node platform, the anonymizing gateway, and the cleansing gateway are controlled by a communications service provider.

14. The method of claim 11, further comprising:

sending, by an unsubscribed mobile device, a second http message, wherein the second http message is directed to a second web content provider host, receiving, by the data service node platform, the second http message from the unsubscribed mobile device, determining, by the data service node platform, that the unsubscribed mobile device is not associated with the privacy service subscription, and based on the determination that the unsubscribed mobile device is not associated with the privacy service subscription, sending the second http message to the second web content provider without inserting the XFT header into the second http message.

15. The method of claim 11, wherein at least one of: the anonymizing gateway is reconfigurable to perform a different privacy information control functionality other than the anonymizing privacy information control functionality or the cleansing gateway is reconfigurable to perform a different privacy information control functionality other than the cleansing information privacy control functionality.

16. The method of claim 11, wherein the cleansing information privacy control functionality comprises at least one of searching for and extracting embedded scripts from the http message or searching for and extracting cookies from the http message.

17. The method of claim 11, wherein at least one of the anonymizing privacy information control functionality performed by the anonymizing gateway or the cleansing privacy information control functionality performed by the cleansing gateway is updated according to child privacy rules and security policies so that at least one of the anonymizing gateway and the cleansing gateway complies with the child privacy rules and security policies.

18. The method of claim 11, further comprising receiving, by the data service node platform, notification of the privacy service subscription from a backoffice system.

19. The method of claim 11, wherein at least one of the anonymizing gateway and the cleansing gateway is reconfigurable to serve as a government security gateway configured to perform information control functionalities to protect government communications.

20. A data network comprising:
a first gateway;
a second gateway; and
a data service node configured to:
  receive an http message from a mobile device,
  determine whether the mobile device is associated with a privacy service subscription,
  based on a determination that the mobile device is associated with the privacy service subscription, insert a forward-to (XFT) header into the http message, wherein the XFT header contains an XFT list, and wherein the XFT list comprises a list of gateways,
  determine that the first gateway is listed first in the XFT list, and
  based on the determination that the first gateway is listed first in the XFT list, forward the http message to the first gateway,
wherein the first gateway is configured to:
  receive the http message,
  perform a first privacy information control functionality on the http message,
  determine that the second gateway is listed next in the XFT list, and
  based on the determination that the second gateway is listed next in the XFT list, forward the http message to the second gateway, and
wherein the second gateway is configured to:
  receive the http message,
  perform a second privacy information control functionality on the http message,
  determine that the second gateway is listed last in the XFT list, and
  based on determining that the second gateway is listed last in the XFT list, forward the http message to a web content provider host.

\* \* \* \* \*